US012317052B2

(12) United States Patent
Lu et al.

(10) Patent No.: US 12,317,052 B2
(45) Date of Patent: May 27, 2025

(54) SPEAKER BOX

(71) Applicant: AAC Microtech (Changzhou) Co., Ltd., Jiangsu (CN)

(72) Inventors: Bing Lu, Changzhou (CN); Shuwen Wu, Changzhou (CN); Dijiang Tong, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 259 days.

(21) Appl. No.: 18/314,161

(22) Filed: May 9, 2023

(65) Prior Publication Data

US 2024/0187794 A1 Jun. 6, 2024

Related U.S. Application Data

(63) Continuation of application No. PCT/CN2022/136716, filed on Dec. 6, 2022.

(51) Int. Cl.
*H04R 9/06* (2006.01)
*H04R 1/28* (2006.01)
*H04R 9/02* (2006.01)

(52) U.S. Cl.
CPC ............... *H04R 9/06* (2013.01); *H04R 1/288* (2013.01); *H04R 9/025* (2013.01)

(58) Field of Classification Search
CPC .......... H04R 9/06; H04R 1/288; H04R 9/025; H04R 1/021
See application file for complete search history.

(56) References Cited

U.S. PATENT DOCUMENTS

2023/0247348 A1* 8/2023 Yang ..................... H04R 1/288 381/353

* cited by examiner

*Primary Examiner* — Tuan D Nguyen
(74) *Attorney, Agent, or Firm* — Wiersch Law Group

(57) ABSTRACT

A speaker box is provided and includes a housing defining a receiving space; and a speaker driver received in the receiving space. The speaker driver includes a basin frame, and a diaphragm and a magnetic circuit system. The speaker driver further includes a metal cover case fixed on the basin frame and the magnetic bowl. The metal cover case includes a bottom wall connected with the magnetic bowl and a side wall bent and extended from the bottom wall, and the leakage hole communicatively couples the first rear cavity with the second rear cavity. The speaker box further includes a metal ring covered on the magnetic bowl and the metal cover case, and the magnetic bowl, the metal cover case, and the metal ring are glued and fixed to one another. In this way, it is possible to effectively avoid blockage of the leakage holes.

11 Claims, 3 Drawing Sheets

SPEAKER BOX

TECHNICAL FIELD

The various embodiments described in this document relate in general to the technical field of sensors, and more specifically to a speaker box.

BACKGROUND

Speaker boxes are common sounding devices in an electronic device. The speaker box generally includes a housing structure and a sounding driver received in the housing structure. The speaker box in related technologies includes an upper cover, a lower cover combined with the upper cover to define a receiving space, and a sounding driver and a metal mesh cover respectively accommodated in the receiving space. The metal mesh cover defines leakage holes. Generally, the leakage holes of the metal mesh cover may be at least partially blocked by the housing structure of the speaker box. In addition, when a magnetic bowl is fixed by glue, the glue may overflow and block some leakage holes, thus affecting the performance of the product.

Therefore, it is necessary to provide a speaker box to solve the above technical problems.

SUMMARY

Embodiments of the disclosure aim to provide a speaker box with stable structure and excellent performance.

In view of the above, embodiments of the disclosure provide a speaker box. The speaker box includes a housing defining a receiving space; and a speaker driver received in the receiving space, where the speaker driver includes a basin frame, and a diaphragm and a magnetic circuit system that are supported on the basin frame, where the diaphragm and the housing cooperatively define a rear cavity, and the magnetic circuit system includes a magnetic bowl and a magnetic steel component fixed on the magnetic bowl. The speaker driver further includes a metal cover case fixed on the basin frame and the magnetic bowl, the metal cover case divides the rear cavity into a first rear cavity located inside the speaker driver and a second rear cavity located outside the speaker driver, and the second rear cavity is filled with sound-absorbing particles. The metal cover case includes a bottom wall connected with the magnetic bowl and a side wall bent and extended from the bottom wall, and the side wall of the metal cover case defines leakage holes recessed from an edge of the side wall far away from the bottom wall, and where the leakage hole communicatively couples the first rear cavity with the second rear cavity; and the speaker box further includes a metal ring covered on the magnetic bowl and the metal cover case, and the magnetic bowl, the metal cover case, and the metal ring are glued and fixed to one another.

In some embodiments, the metal cover case further includes an extension wall extending outward from the bottom wall, and the extension wall and the housing cooperatively define the second rear cavity.

In some embodiments, the bottom wall of the metal cover case extends beyond an outer edge of the metal ring.

In some embodiments, there is a receiving groove defined between an inner side of the metal ring and the magnetic bowl to receive excess glue.

In some embodiments, the side wall is abutted against the basin frame.

In some embodiments, the speaker driver is rectangular, the housing is provided with projections at positions corresponding to four corner portions of the speaker driver, and the projections support part of the bottom wall of the metal cover case.

In some embodiments, the metal cover case is an integral stamping structure.

Compared with related technologies, the speaker box of the present disclosure includes the housing defining the receiving space and the speaker driver received in the receiving space. The speaker driver includes the basin frame, and the diaphragm and the magnetic circuit system respectively supported on the basin frame, where the diaphragm and the housing form the rear cavity. The magnetic circuit system includes the magnetic bowl and the magnetic steel component fixed on the magnetic bowl. The speaker driver further includes the metal cover case fixed on the basin frame and the magnetic bowl. The metal cover case divides the rear cavity into the first rear cavity located inside the speaker driver and the second rear cavity located outside the speaker driver. The second rear cavity is filled with sound-absorbing particles. The metal cover case includes the bottom wall connected with the magnetic bowl and the side wall bent and extended from the bottom wall, and the side wall of the metal cover case defines the leakage holes recessed from an edge of the side wall far away from the bottom wall. The leakage hole communicatively couples the first rear cavity with the second rear cavity. The speaker box further includes the metal ring covered on the magnetic bowl and the metal cover case, and the magnetic bowl, the metal cover case, and the metal ring are glued and fixed. According to the technical solutions, since the traditional plastic cover plate is changed into the metal ring structure and the metal ring structure is glued and fixed with the magnetic bowl and the metal cover case, it is possible to avoid the blockage of the leakage holes on the metal cover case by the plastic case, and the gluing of the magnetic bowl also avoids that the glue flows to the leakage holes, thus effectively improving the acoustic performance of the speaker box.

BRIEF DESCRIPTION OF THE DRAWINGS

In order to more clearly explain that technical solutions in embodiments of the disclosure, the drawings required for use in the embodiments will be briefly described below, and it will be apparent that the drawings described below are only some of the embodiments of the disclosure, from which other drawings may be obtained without creative effort by a person of ordinary skill in the art.

DETAILED DESCRIPTION OF THE EMBODIMENTS

A clear and complete description of the technical aspects of the embodiments of the disclosure will be given below in conjunction with the accompanying drawings in the embodiments of the disclosure, and it will be apparent that the described embodiments are only part of the embodiments of the disclosure, not all the embodiments of the disclosure. Based on the embodiments in the present disclosure, all other embodiments obtained without creative effort by those of ordinary skill in the art fall within the scope of protection of the present disclosure.

Figure 1:
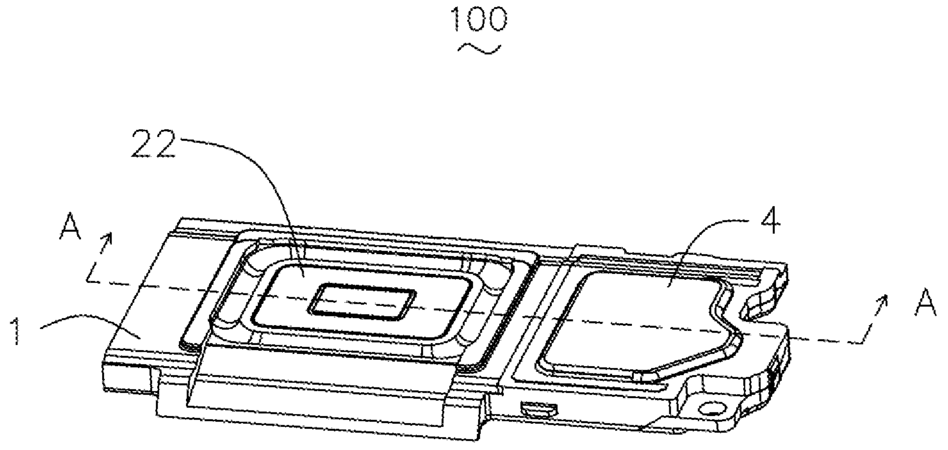
FIG. 1 is a three-dimensional schematic structural view of a speaker box according to embodiments of the disclosure.
Figure 2:
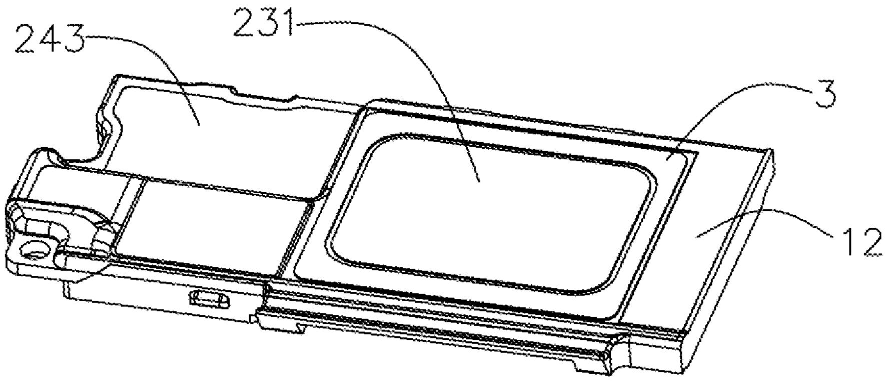
FIG. 2 is a three-dimensional schematic structural view of the speaker box shown in FIG. 1 from another perspective.
Figure 3:
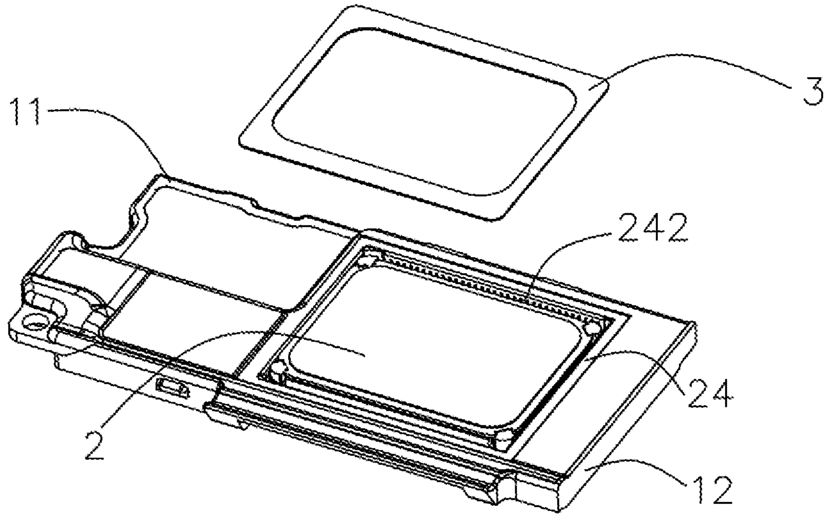
FIG. 3 is a partially exploded view of the speaker box shown in FIG. 1.
Figure 4:
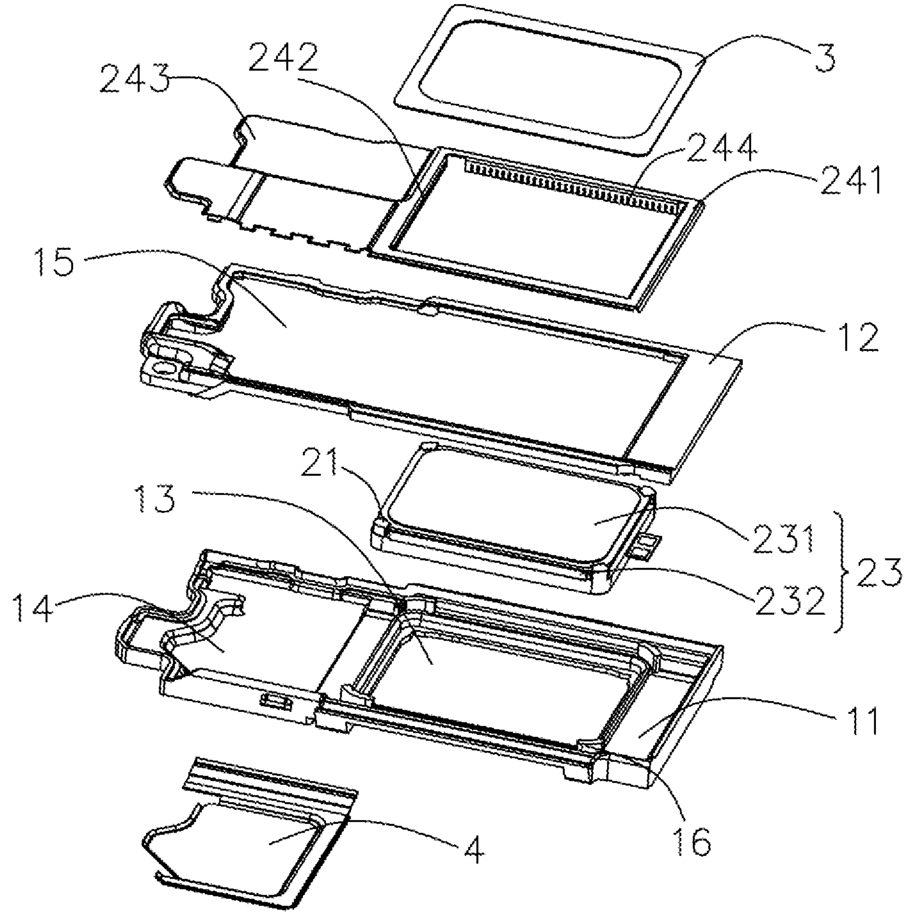
FIG. 4 is an exploded view of the speaker box shown in FIG. 1.
Figure 5:
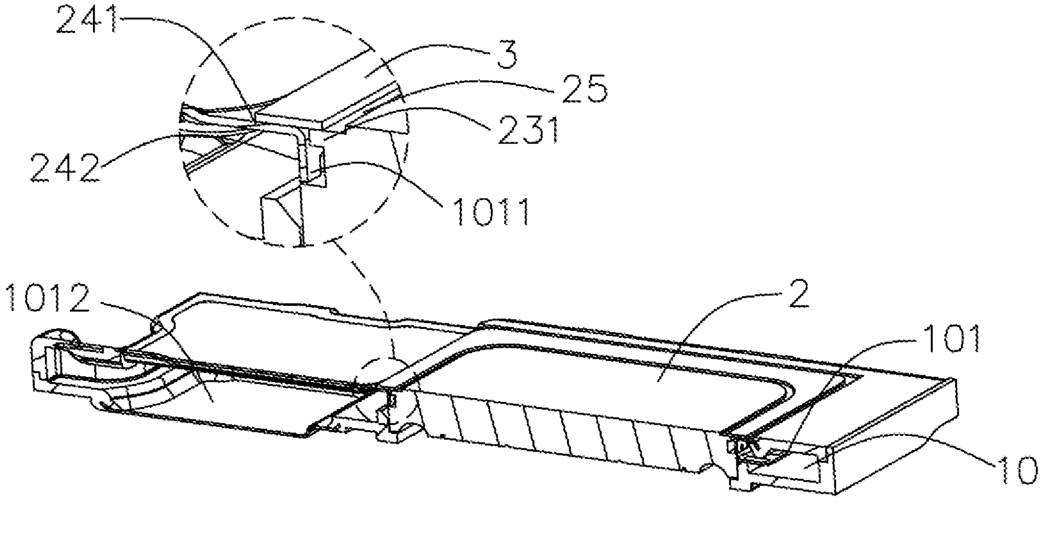
FIG. 5 is a sectional view of the speaker box along line A-A in FIG. 1.

Referring to FIGS. 1 to 5, embodiments of the disclosure provide a speaker box 100. The speaker box 100 includes a housing 1 defining a receiving space 10, a speaker driver 2 received in the receiving space 10, a metal ring 3 covered on the housing 1, and a metal cover plate 4 fixed to the housing 1.

The housing 1 includes a first housing 11 and a second housing 12 covered with the first housing 11. The first housing 11, the second housing 12, and the metal cover plate 4 cooperatively define the receiving space 10. The first housing 11 defines a first through hole 13 and a second through hole 14, and the second housing 12 defines a third through hole 15. The first through hole 13 is defined around the speaker driver 2. The metal cover plate 4 is covered on the second through hole 14 and used for sealing the second through hole 14, and the third through hole 15 is arranged around the speaker driver 2.

The speaker driver 2 is rectangular and includes a basin frame 21, a diaphragm 22 and a magnetic circuit system 23 supported on the basin frame 21, and a metal cover case 24 fixed to the basin frame 21 and the magnetic circuit system 23. The magnetic circuit system 23 is configured to drive the diaphragm 22 to vibrate to output sound. The diaphragm 22 and the housing 1 cooperate with each other to define a rear cavity 101. The magnetic circuit system 23 includes a magnetic bowl 231 and a magnetic steel assembly 232 fixed to the magnetic bowl 231.

The metal cover case 24 is fixed to the basin frame 21 and the magnetic bowl 231. The metal cover case 24 divides the rear cavity 101 into a first rear cavity 1011 located inside the speaker driver 2 and a second rear cavity 1012 located outside the speaker driver 2. The second rear cavity 1012 is filled with sound-absorbing particles, and the metal cover case 24 is configured to prevent the sound-absorbing particles from entering the second rear cavity 1012. The metal cover case 24 includes a bottom wall 241 connected with the magnetic bowl 231, a side wall 242 bent and extended from the bottom wall 241, and an extension wall 243 extending outward from the bottom wall 241. The bottom wall 241 has an annular structure. The side wall 242 is abutted against the basin frame 21. The extension wall 243 is arranged corresponding to the metal cover plate 4, and the extension wall 243 is cooperated with the metal cover plate 4 and the housing 1 to define the second rear cavity 1012.

The side wall 242 of the metal cover case 24 defines leakage holes 244 recessed from an edge of the side wall 242 away from the bottom wall 241. Each leakage hole 244 communicatively couples the first rear cavity 1011 with the second rear cavity 1012 to allow airflow therebetween, and each leakage hole 244 is serrated. Since each leakage hole 244 extends from the edge of the side wall 242, the leakage hole 244 can be formed on the side wall 242 of the metal cover case 24 by stamping. Preferably, the entire metal cover case 24 is an integral stamping structure. A surface of the magnetic bowl 231 is flush with a surface of the metal cover case 24 at a position where the magnetic bowl 231 is connected with the metal cover case 24. The metal ring 3 is glued and fixed with the surface of the magnetic bowl 231 and the surface of the metal cover case 24 by glue. A receiving groove 25 is defined between an inner side of the metal ring 3 and the magnetic bowl 231 to accommodate redundant glue. In addition, the bottom wall 241 of the metal cover case 24 extends beyond an outer edge of the metal ring 3, so that glue is not easily flowed down from the bottom wall 241 of the metal cover case 24, thereby preventing the leakage holes 244 from being blocked by glue.

The housing 1 is provided with projections 16 at positions corresponding to four corner portions of the speaker driver 2. The projections 16 support part of the bottom wall 241 of the metal cover case 24. The speaker driver 2, the metal cover case 24, and the metal ring 3 cover part of the third through hole 15 of the housing 1, and the magnetic bowl 231 is partially exposed to the third through hole 15.

Compared with related technologies, the speaker box of the present disclosure includes the housing defining the receiving space and the speaker driver received in the receiving space. The speaker driver includes the basin frame, and the diaphragm and the magnetic circuit system respectively supported on the basin frame, where the diaphragm and the housing form the rear cavity. The magnetic circuit system includes the magnetic bowl and the magnetic steel component fixed on the magnetic bowl. The speaker driver further includes the metal cover case fixed on the basin frame and the magnetic bowl. The metal cover case divides the rear cavity into the first rear cavity located inside the speaker driver and the second rear cavity located outside the speaker driver. The second rear cavity is filled with sound-absorbing particles. The metal cover case includes the bottom wall connected with the magnetic bowl and the side wall bent and extended from the bottom wall, and the side wall of the metal cover case defines the leakage holes recessed from an edge of the side wall far away from the bottom wall. The leakage hole communicatively couples the first rear cavity with the second rear cavity. The speaker box further includes the metal ring covered on the magnetic bowl and the metal cover case, and the magnetic bowl, the metal cover case, and the metal ring are glued and fixed. According to the technical solutions, since the traditional plastic cover plate is changed into the metal ring structure and the metal ring structure is glued and fixed with the magnetic bowl and the metal cover case, it is possible to avoid the blockage of the leakage holes on the metal cover case by the plastic case, and the gluing of the magnetic bowl also avoids that the glue flows to the leakage holes, thus effectively improving the acoustic performance of the speaker box.

The foregoing embodiments are merely some embodiments of the disclosure and are not intended to limit the present disclosure. Any modifications, equivalents, modifications, or the like made within the spirit and principles of the present disclosure should be included within the scope of protection of the present disclosure.

What is claimed is:

1. A speaker box, comprising:

a housing defining a receiving space; and a speaker driver received in the receiving space, wherein the speaker driver includes a basin frame, and a diaphragm and a magnetic circuit system that are supported on the basin frame, wherein the diaphragm and the housing cooperatively define a rear cavity, and the magnetic circuit system includes a magnetic bowl and a magnetic steel component fixed on the magnetic bowl, wherein the speaker driver further includes a metal cover case fixed on the basin frame and the magnetic bowl, the metal cover case divides the rear cavity into a first rear cavity located inside the speaker driver and a second rear cavity located outside the speaker driver, and the second rear cavity is filled with sound-absorbing particles;

the metal cover case includes a bottom wall connected with the magnetic bowl and a side wall bent and extended from the bottom wall, and the side wall of the metal cover case defines leakage holes recessed from an edge of the side wall far away from the bottom wall, and wherein each leakage hole communicatively couples the first rear cavity with the second rear cavity; and the speaker box further includes a metal ring covered on the magnetic bowl and the metal cover case, and the magnetic bowl, the metal cover case, and the metal ring are glued and fixed to one another.

2. The speaker box of claim 1, wherein the metal cover case further includes an extension wall extending outward from the bottom wall, and the extension wall and the housing cooperatively define the second rear cavity.

3. The speaker box of claim 1, wherein the bottom wall of the metal cover case extends beyond an outer edge of the metal ring.

4. The speaker box of claim 1, wherein there is a receiving groove defined between an inner side of the metal ring and the magnetic bowl to receive excess glue.

5. The speaker box of claim 1, wherein the side wall is abutted against the basin frame.

6. The speaker box of claim 1, wherein the speaker driver is rectangular, the housing is provided with projections at positions corresponding to four corner portions of the speaker driver, and the projections support part of the bottom wall of the metal cover case.

7. The speaker box of claim 1, wherein the metal cover case is an integral stamping structure.

8. The speaker box of claim 1, wherein the metal cover case is configured to prevent the sound-absorbing particles from entering the second rear cavity.

9. The speaker box of claim 1, wherein the speaker box further includes a metal cover plate fixed to the housing, the metal cover case further includes an extension wall, and the extension wall is arranged corresponding to the metal cover plate.

10. The speaker box of claim 1, wherein each leakage hole is serrated.

11. The speaker box of claim 1, wherein a surface of the magnetic bowl is flush with a surface of the metal cover case at a position where the magnetic bowl is connected with the metal cover case.

* * * * *